(12) United States Patent
Nagao et al.

(10) Patent No.: US 10,394,104 B2
(45) Date of Patent: Aug. 27, 2019

(54) LIGHT AMOUNT ADJUSTMENT APPARATUS AND OPTICAL APPARATUS INCLUDING THE SAME

(71) Applicant: CANON KABUSHIKI KAISHA, Tokyo (JP)

(72) Inventors: Yuki Nagao, Utsunomiya (JP); Makoto Hayakawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/933,128

(22) Filed: Mar. 22, 2018

(65) Prior Publication Data

US 2018/0284572 A1 Oct. 4, 2018

(30) Foreign Application Priority Data

Mar. 31, 2017 (JP) .................................. 2017-072930

(51) Int. Cl.
*G03B 9/06* (2006.01)
*G03B 17/14* (2006.01)

(52) U.S. Cl.
CPC .............. *G03B 9/06* (2013.01); *G03B 17/14* (2013.01)

(58) Field of Classification Search
CPC .................................. G03B 9/06; G03B 17/14
USPC .......................................................... 396/505
See application file for complete search history.

(56) References Cited

U.S. PATENT DOCUMENTS

| 4,772,909 A * | 9/1988 | Ogasawara | ............... G02B 7/36 396/136 |
| 2009/0263120 A1* | 10/2009 | Kurosawa | ................ G03B 9/02 396/508 |

FOREIGN PATENT DOCUMENTS

| JP | 02-020842 A | 1/1990 |
| JP | 2010-014814 A | 1/2010 |
| JP | 2012-078690 A | 4/2012 |

* cited by examiner

*Primary Examiner* — Clayton E. LaBalle
*Assistant Examiner* — Linda B Smith
(74) *Attorney, Agent, or Firm* — Canon U.S.A., Inc. IP Division

(57) ABSTRACT

A light amount adjustment apparatus includes an aperture unit including a plurality of blade members and a movable member, the movable member for changing a size of an aperture formed by the plurality of blade members, a driving unit including a driving shaft and configured to drive the movable member, and a detection unit including a detection target member and a detection sensor, and configured to detect a driving amount of the driving unit by detecting a driving amount of the detection target member with use of the detection sensor, wherein the aperture unit, the driving unit, and the detection unit overlap one another, as viewed in a direction along a central axis of the aperture, wherein the detection target member is engaged with the driving shaft, and wherein an outer diameter of the detection unit is smaller than an outer diameter of the driving unit.

17 Claims, 8 Drawing Sheets

LIGHT AMOUNT ADJUSTMENT APPARATUS AND OPTICAL APPARATUS INCLUDING THE SAME

BACKGROUND

Field of the Disclosure

The present disclosure relates to a light amount adjustment apparatus and an optical apparatus including the light amount adjustment apparatus.

Description of the Related Art

As an electronically controlled aperture apparatus for adjusting a light amount of imaging light, there is known an aperture apparatus discussed in Japanese Patent Application Laid-Open. No. 2-20842. The aperture apparatus discussed in Japanese Patent Application Laid-Open No. 2-20842 includes an aperture unit formed by, for example, a plurality of diaphragm blades and a case for containing the diaphragm blades, a stepping motor as a driving unit for changing a diameter of a diaphragm aperture, and a detection unit for detecting a driving amount of the stepping motor.

In a configuration discussed in Japanese Patent Application Laid-Open No. 2-20842, the detection unit (a photo-interrupter 21 and a gear 3x) and the stepping motor 3 do not overlap the aperture unit as viewed in a direction along a central axis of the aperture of the aperture unit. Therefore, applying the configuration discussed in Japanese Patent Application Laid-Open No. 2-20842 to an optical apparatus undesirably leads to an increase in a size of the optical apparatus in a radial direction.

SUMMARY

The present disclosure is directed to providing a light amount adjustment apparatus smaller in the radial direction than the conventional apparatuses, and an optical apparatus including this light amount adjustment apparatus.

According to an aspect of the present disclosure, a light amount adjustment apparatus includes an aperture unit including a plurality of blade members and a movable member, the plurality of blade members forming an aperture, the movable member being capable of changing a size of the aperture formed by the plurality of blade members, a driving unit including a driving shaft and configured to drive the movable member, and a detection unit including a detection target member and a detection sensor, and configured to detect a driving amount of the driving unit by detecting a driving amount of the detection target member with use of the detection sensor, wherein at least a part of the aperture unit, at least a part of the driving unit, and at least a part of the detection unit overlap one another, as viewed in a direction along a central axis of the aperture, wherein the detection target member is engaged with the driving shaft, and wherein an outer diameter of the detection unit is smaller than an outer diameter of toe driving unit.

Further features of the present disclosure will become apparent from the following description of exemplary embodiments with reference to the attached drawings.

DESCRIPTION OF THE EMBODIMENTS (Configuration of Optical Apparatus)

A configuration of an interchangeable lens 100 as an optical apparatus equipped with a light amount adjustment apparatus, which will be described below, will be described with reference to FIG. 1. The interchangeable lens 100 is attachable to and detachable from a camera body (a camera main body) 200 including an image sensor 300, but the light amount adjustment apparatus that will be described in each of exemplary embodiments of the present disclosure may be mounted on an imaging apparatus, such as a lens-integrated type digital camera or a video camera.

A first lens group L1, a second lens group (a first lens unit) L2, a third lens group second lens unit) L3, a fourth group lens L4, and a fifth lens group L5 are held in the interchangeable lens 100 as a plurality of lens units forming an imaging optical system. Each of the lens groups includes at least one lens forming this lens group, and a lens holding frame (a holding member) 8, 9, 10, 11, or 12 holding the lens(es). In the following description, a direction in which an optical axis of the imaging optical system extends will be referred to as an optical axis direction. The first, second, fourth, and fifth lens groups L1, L2, L4, and L5 are fixed groups stationary in the optical axis direction. The third lens group L3 is a focusing group that is moved in the optical axis direction to carry out a focus adjustment at the time of focusing. More specifically, the third lens group L3 and the third lens holding frame 8 are movable so as to change a distance to the second lens holding frame 9 in the optical axis direction (a direction along a central axis of an aperture and a direction along a central axis of a rotation of a blade driving ring 43) for the focusing.

The interchangeable lens 100 includes a mount 1 for mounting the interchangeable lens 100 to the camera body 200, a base barrel 2 coupled with the mount 1, and a fixed barrel 3 fixed relative to the base barrel 2 in the optical axis direction and a circumferential direction around the optical axis. The interchangeable lens 100 further includes an intermediate barrel 4 fixed relative to the fixed barrel 3 in the optical axis direction and the circumferential direction around the optical axis, a focusing actuator 30 fixed relative to the intermediate barrel 4 in the optical axis direction and the circumferential direction around the optical axis, a guide barrel 6, and a cam barrel 7.

An electric circuit substrate 20 is attached to the intermediate barrel 4. The electric circuit substrate 20 is in charge of power supply and electric communication when the interchangeable lens 100 and the camera body 200 are assembled to each other, and also in charge of control of driving of a diaphragm, the focusing group, and the like in the interchangeable lens 100.

A plurality of not-illustrated straight grooves for guiding the third lens group L3 in the optical axis direction is provided on the guide barrel 6. Each of the plurality of straight grooves is provided in three phases at even intervals in the circumferential direction around the optical axis on the guide barrel 6. The cam barrel 7 is held rotatably around the optical axis relative to the guide barrel 6 while an inner peripheral surface of the cam barrel 7 and an outer peripheral surface of the guide barrel 6 are radially fitted to each other. A plurality of not-illustrated cam grooves for moving the third lens group L3 in the optical axis direction by a rotation of the cam barrel 7 is provided on the cam barrel 7. Each of the plurality of cam grooves is provided in three phases at even intervals in the circumferential direction on the cam barrel 7.

The third lens group L3 is disposed on an inner periphery of the guide barrel 6. As illustrated in FIG. 1, a cam follower 14 provided on the third lens holding frame (a second holding member) 8 holding the third lens group L3 is engaged with the straight grooves of the guide barrel 6 and the cam grooves of the cam barrel 7. Due to this configuration, the third lens group L3 is held movably in the optical axis direction but non-rotatably in the circumferential direction relative to the guide barrel 6.

An aperture apparatus (the light amount adjustment apparatus) 40, which adjusts a light amount of imaging light entering the interchangeable lens 100, is provided between the second lens group L2 and the third lens group L3. The aperture apparatus 40 is configured in a manner that will be described below, and is equipped with a stepping motor 80 and adjusts the light amount by driving a plurality of diaphragm blades, which will be described below, in the aperture apparatus 40 with use of the stepping motor 80.

Further, a not-illustrated flexible substrate for supplying power to the stepping motor 80 is disposed on the aperture apparatus 40. One end of the flexible substrate is connected to a terminal portion of the stepping motor 80, and the other end of the flexible substrate is connected to the electric circuit substrate 20. The aperture apparatus 40 is held by a focusing unit main body (a cylindrical member) 5. The aperture apparatus 40 is held by the focusing unit main body 5 with use of a not-illustrated hole portion provided to some portion of the focusing unit main body 5, in particular, a cylindrical portion 5b illustrated in FIG. 1, and a not-illustrated screw inserted in this hole portion. The second lens holding frame 9 (a flange portion 9c) is held by the focusing unit main body 5 (the cylindrical portion 5b).

The focusing actuator 30 includes the focusing unit main body 5, a stator 31, a rotor 32, a coupling ring 33, a rotational ring 34, and a fixed ring 35. A not-illustrated piezoelectric element is attached to the stator 31, and the stator 31 is held unmovably in the optical axis direction and non-rotatably relative to the focusing unit main body 5. One end of a not-illustrated flexible substrate for supplying power to the piezoelectric element of the stator 31 is connected to the stator 31, and the other end of the flexible substrate is connected to the electric circuit substrate 20. When a control signal from this flexible substrate is fed to the stator 31, the piezoelectric element attached to the stator 31 vibrates and causes a rotation of the rotor 32 around the optical axis. The rotor 32 is held rotatably around the optical axis relative to the focusing unit main body 5 with a ball bearing structure. The rotor 32 is integrated with the coupling ring 33 by, for example, adhesion. Therefore, the rotor 32 and the coupling ring 33 are integrally rotated around the optical axis.

The coupling ring 33 and the rotational ring 34 are connected to each other with a structure that transmits a rotational force while slowing down the rotation so as to reduce a rotational amount 2 of the coupling ring 33 to a rotational amount 1 (a rotational amount half as large as the rotational amount 2) of the rotational ring 34 with use of a not-illustrated structure. When being rotated, the rotational ring 34 rotates the cam barrel 7 around the optical axis via a not-illustrated coupling key. A not-illustrated scale for detecting the rotational amount of the rotational ring 34 is circumferentially attached to an inner peripheral surface of the rotational ring 34 The focusing actuator 30 has such a mechanism that the rotation is detected by a not-illustrated rotation detection sensor installed on a surface on one side where the focusing unit main body 5 is located based on this scale.

(Configuration of Light Amount Adjustment Apparatus)

Next, the configuration of the aperture apparatus 40 as the light amount adjustment apparatus according to the present exemplary embodiment will be described with reference to FIGS. 2 to 5. The aperture apparatus 40 includes a stepping motor (a driving unit) 80, a diaphragm blade containing unit (an aperture unit) 70, and a rotation detection unit (a detection unit) 60.

(Configuration of Driving Unit)

Figure 2:
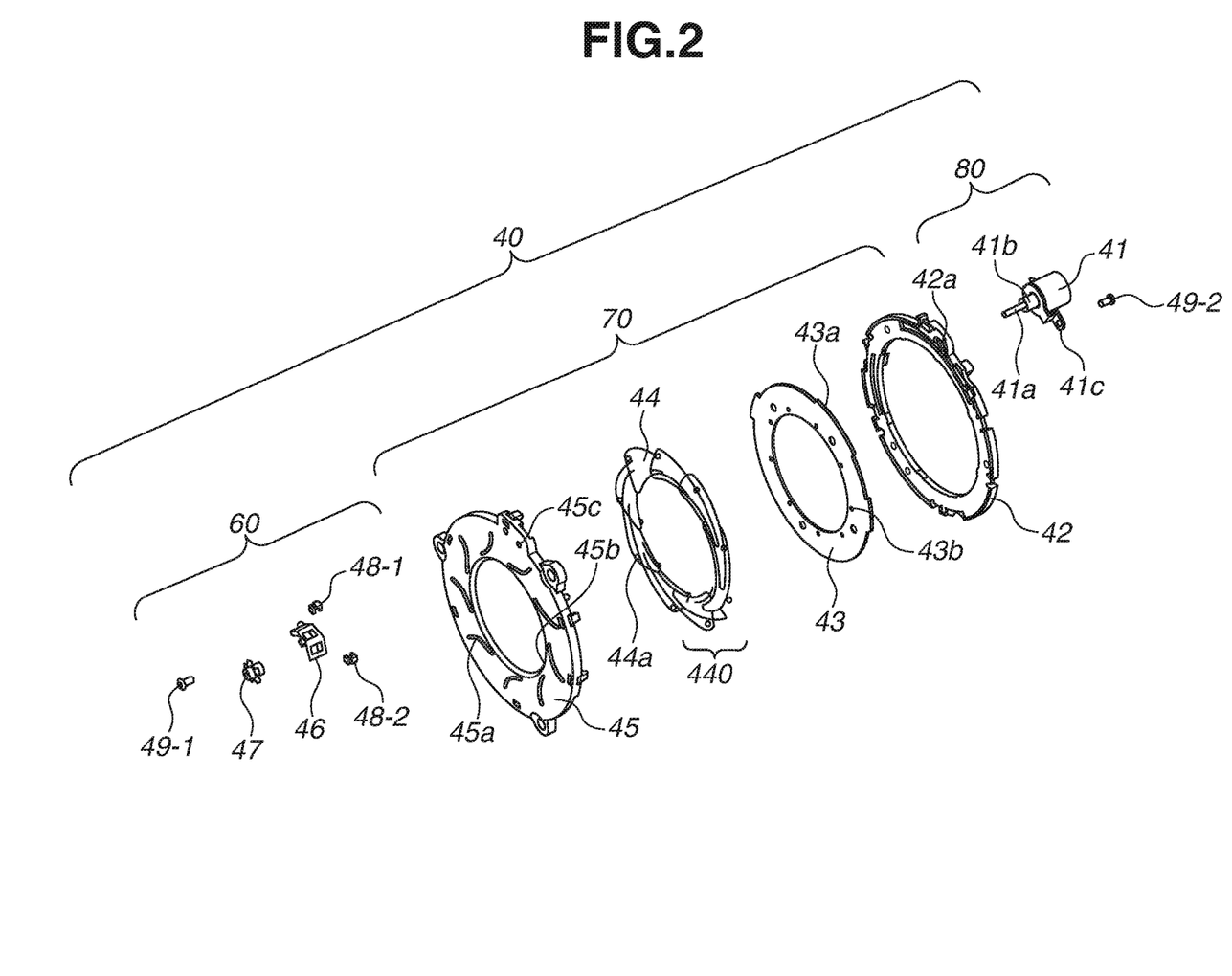
FIG. 2 is an exploded perspective view of an aperture apparatus according to an exemplary embodiment of the subject disclosure.

As illustrated in FIG. 2, the stepping motor 80 includes a main body portion 41, a motor rotational shaft (a driving shaft) 41a integrated with a rotational rotor inside the stepping motor 80, a pinion gear (a first gear portion) 41b fixed to the motor rotational shaft 41a, and an attachment metal plate 41c. The stepping motor 80 is positioned due to fitted engagement of a positioning portion 41d and a through-hole 42a with each other, and is fixed to a motor plate 42, which will be described below, with use of a screw 49-2 via a hole portion of the attachment metal plate 41c.

(Configuration of Aperture Unit)

As illustrated in FIG. 2, the diaphragm blade containing unit 70 includes the motor plate 42, the blade driving ring (a movable member) 43, a diaphragm blade group 440, which is a set of nine diaphragm blades (blade members) 44, and a cam plate (a fixed member) 45. The blade driving ring 43 is disposed on one surface of the motor plate 42, and is held rotatably around the optical axis relative to the motor plate 42. A gear (a second gear portion) 43a is provided at a part of an outer periphery of the blade driving ring 43. The gear 43a has a meshing relationship with the pinion gear 41b. Therefore, when the motor rotational shaft 41a is rotated, the blade driving ring 43 is rotated around the optical axis.

The diaphragm blades 44 are blade members independent of one another, and not-illustrated first protrusions respectively provided on individual surfaces of the plurality of diaphragm blades 44 that face one side where the blade driving ring 43 is located are fitted in through-holes 43b (nine through-holes 43b at even intervals in the circumferential direction) provided to the blade driving ring 43, respectively. Second protrusions 44a respectively provided on individual surfaces of the diaphragm blades 44 that face the other side where the cam plate 45 is located are fitted in a plurality of cam grooves 45a provided to the cam plate 45, respectively. Therefore, when the blade driving ring 43 is rotated around the central axis of the diaphragm aperture, the diaphragm blades 44 are driven in such a manner that the second protrusions 44a are moved in the cam grooves 45a while the first protrusions are kept fitted in the through-holes 43b. In other words, the aperture apparatus 40 is configured in such a manner that, when the blade driving ring 43 is rotated around the optical axis, the diaphragm blades 44 appear from an inner peripheral portion 45b of the cam plate 45 into an optical path, and change an area of an aperture portion formed by individual edge portions of the diaphragm blades 44 that face a center of the optical axis. At this time, the cam plate 45 is fixed in a rotational direction around the central axis of the aperture.

(Configuration of Detection Unit)

The rotation detection unit 60 includes a sensor holding block 46, a pulse plate (a detection target member) 47, and photo-interrupters (detection sensors) 48-1 and 48-2. The sensor holding block 46 with the photo-interrupters 48-1 and 48-2 attached thereto is fixed on a foremost surface of the cam plate 45 with use of a screw 49-1. A central portion of the pulse plate 47 is fixed to an extension portion of the motor rotational shaft 41a, and the pulse plate 47 is rotated integrally with the rotation of the motor rotational shaft 41a.

Figure 3A:
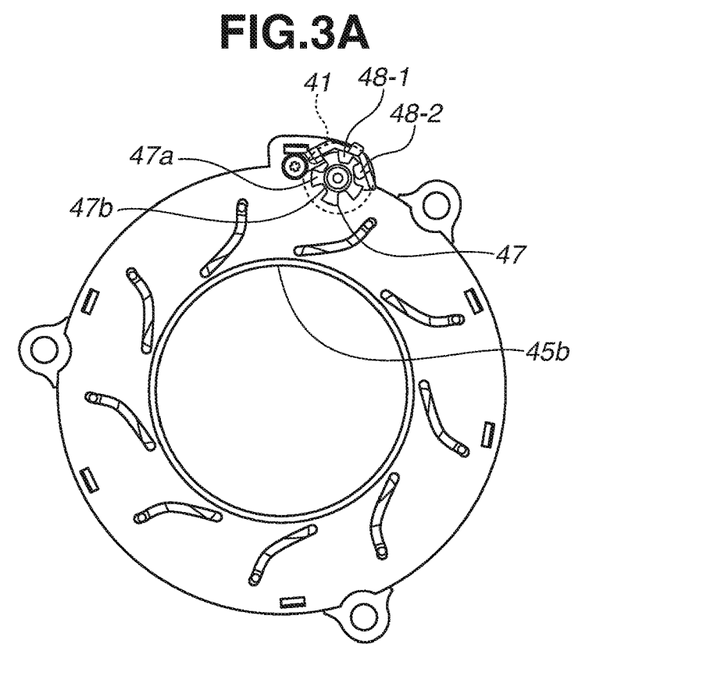
FIGS. 3A and 3B are a front view and a back view of the aperture apparatus according to an exemplary embodiment of the subject disclosure, respectively.
Figure 3B:
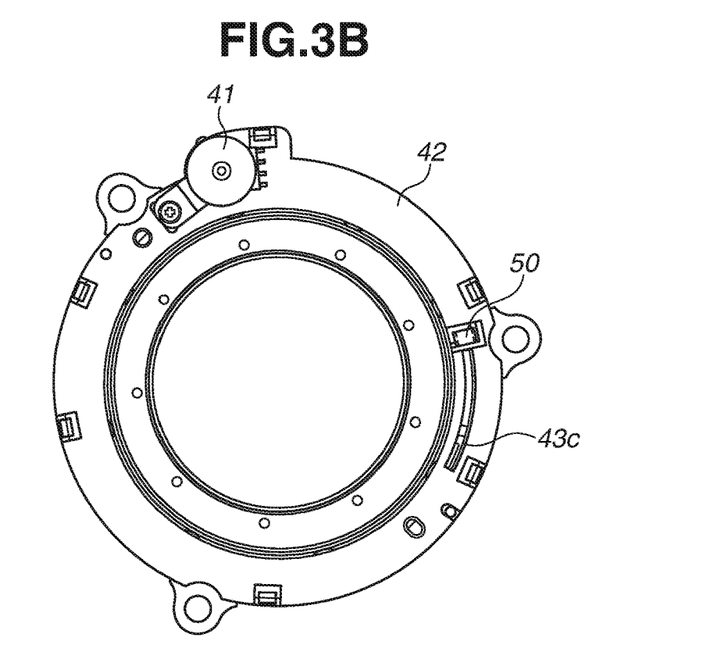

FIG. 3A is a front view of the aperture apparatus 40 as viewed from an object side, and FIG. 3B is a back view of the aperture apparatus 40 as viewed from the other side where the mount 1 is located. As illustrated in FIG. 3A, the pulse plate 47 has a petal shape with protruding portions 47a land recessed portions 47b alternately disposed. The protruding portions 47a are disposed so as to be inserted into light emission/reception portions of the photo-interrupters 48-1 and 48-2, which establishes such a mechanism that changes in outputs of the photo-interrupters 48-1 and 48-2 are acquired according to the rotation of the motor rotational shaft 41a. The rotation of the motor rotational shaft 41a causes a square wave to be output from each of the photo-interrupters 48-1 and 48-2, and a relationship between the protruding portions 47a and the recessed portions 47b and the two photo-interrupters 48-1 and 48-2 is set in such a manner that output waveforms of both of them are out of phase with each other by 90 degrees or 270 degrees. At this time, a rotational amount and a rotational speed of the motor rotational shaft 41a can be calculated from the outputs of the photo-interrupters 48-1 and 48-2. In other words, the rotation detection unit 60 can detect a driving amount of the above-described stepping motor 80, more specifically, the rotational amount and the rotational speed of the motor rotational shaft 41a by detecting a driving amount (a rotation amount) of the pulse plate 47 with use of the photo-interrupters 48-1 and 48-2.

A photo-interrupter 50, which determines an absolute position of the blade driving ring 43, is provided between the blade driving ring 43 and the motor plate 42. The photo-interrupter 50 is fixed to a surface of the motor plate 42 on one side where the stepping motor 80 is located, and a protruding portion 43c of the blade driving ring 43 shields a light emission/reception portion of the photo-interrupter 50 when the blade driving ring 43 is rotated around the optical axis by a predetermined or more rotational amount. More specifically, an output of the photo-interrupter 50 is changed in such a state that the individual edge portions of the diaphragm blades 44 that face the center of the optical axis are completely hidden by the inner peripheral portion 45b of the cam plate 45. The inner peripheral portion 45b referred to here means an annular portion (a portion where the cam grooves 45a are provided) of the cam plate 45 that does not include the aperture.

(Configuration Capable of Radial Size Reduction)

Next, a configuration capable of reducing a size in a radial direction that the aperture apparatus 40 according to the present exemplary embodiment has will be described. As illustrated in FIG. 1, the pulse plate 47 is engaged with the motor rotational shaft 41a, and the motor rotational shaft 41a penetrates through a part of the components of the diaphragm blade containing unit 70. More specifically, the motor rotational shaft 41a penetrates through a hole portion 45c provided to the cam plate 45 as illustrated in FIG. 2. In other words, the cam plate 45 is engaged with the motor rotational shaft 41a. The aperture apparatus 40 may be configured in such a manner that a cutout portion is provided at a part of the outer periphery of the cam plate 45 instead of the hole portion 45c, and this cutout portion and the motor rotational shaft 41a are fitted to each other.

Figure 4A:
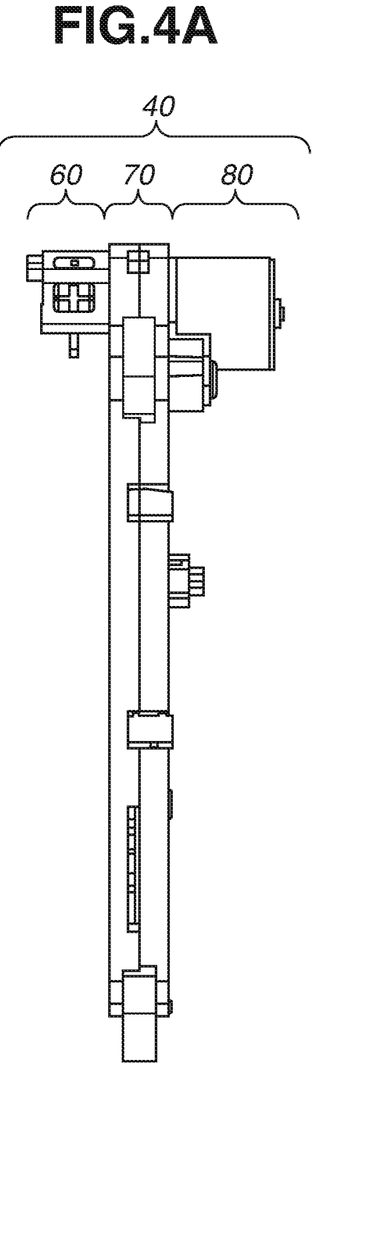
FIGS. 4A and 4B are side views of the aperture apparatus according to an exemplary embodiment of the subject disclosure.
Figure 4B:
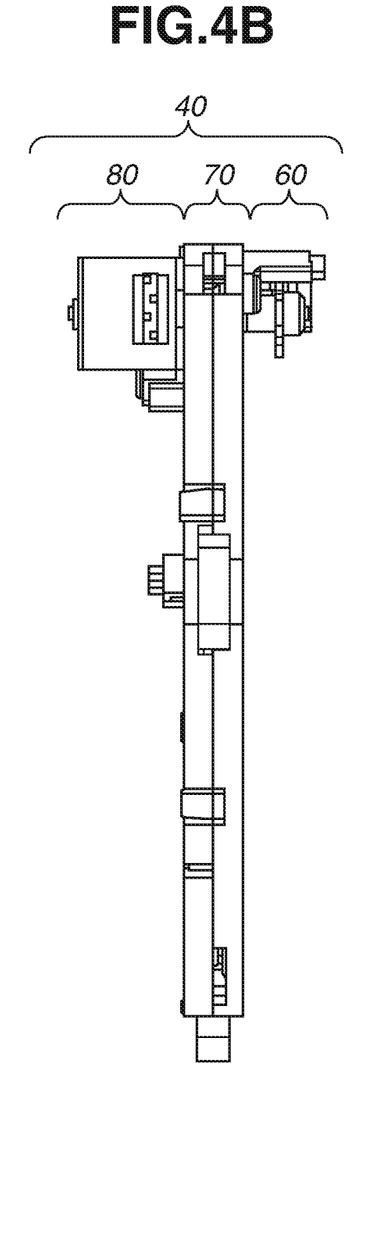

In other words, as illustrated in FIG. 3A, the aperture apparatus 40 is configured in such a manner that at least a part of the diaphragm blade containing unit 70, at least a part of the stepping motor 80, and at least a part of the rotation detection unit 60 overlap one another as viewed in a direction along the central axis of the aperture. A circle defined by a broken line in FIG. 3A indicates a position of the main body potion 41. The rotation detection unit 60 and the stepping motor 80 are provided on one side and the other side of the diaphragm blade containing unit 70, respectively, in the optical axis direction (the direction along the central axis of the aperture) as illustrated in FIGS. 4A and 4B as viewed in a direction orthogonal to the direction along the central axis of the aperture.

Due to such a configuration, the aperture apparatus 40 according to the present exemplary embodiment can be reduced in size in the radial direction compared to a configuration in which the rotation detection unit 60 is provided on an outer periphery of the diaphragm blade containing unit 70. The interchangeable lens 100 including the aperture apparatus 40 configured in this manner can be reduced in size in the radial direction compared to an interchangeable lens including an aperture apparatus having the above-described compared configuration.

(More Desirable Configuration)

Next, a more desirable configuration capable of achieving a different effect from the above-described effect or improving the above-described effect will be described.

Figure 1:
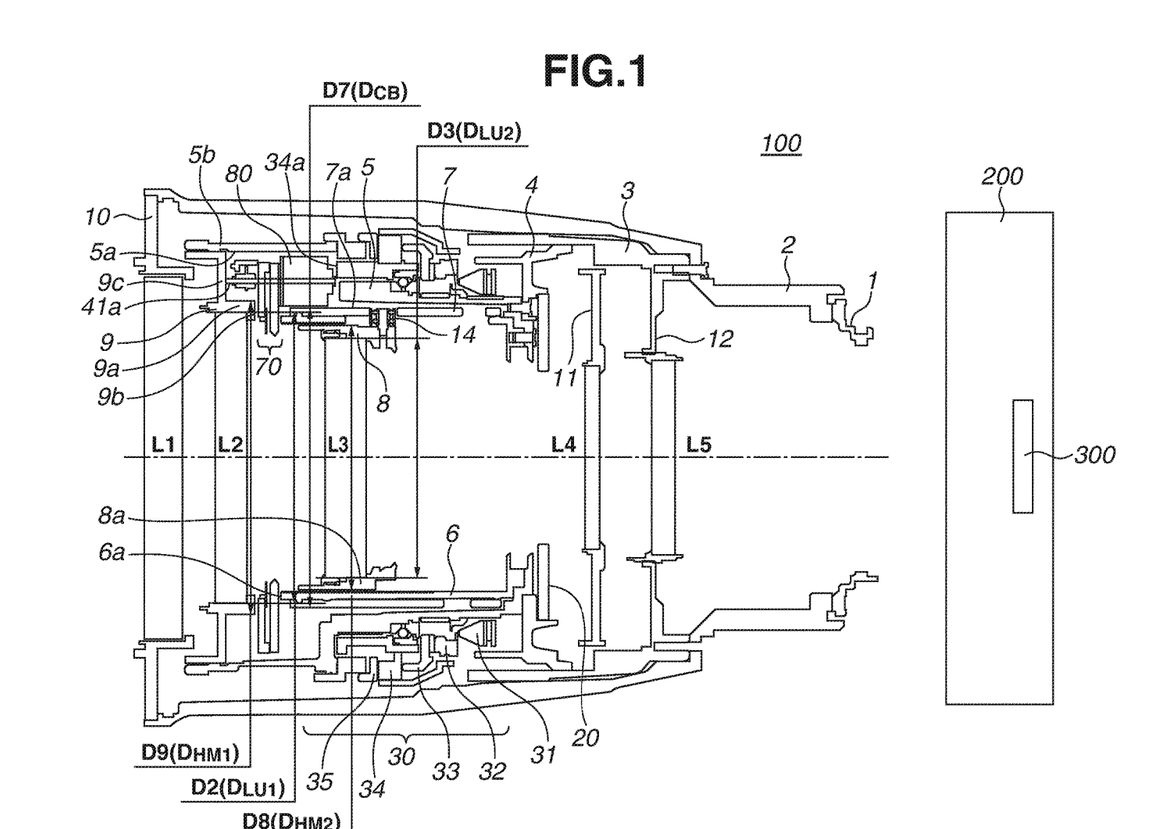
FIG. 1 is a cross-sectional view illustrating a configuration holding a partial optical system of an interchangeable lens according to an exemplary embodiment of the subject disclosure.

As illustrated in FIG. 1, the stepping motor 80 is disposed in a space portion between the inner peripheral surface 5a of the focusing unit main body 5 and an outer peripheral surface 7a of the cam barrel 7 in the radial direction (the direction orthogonal to the optical axis and the direction orthogonal to the direction along the central axis of the aperture). In other words, at least a part of the stepping motor 80 overlaps at least a part of the cam barrel 7 or at least a part of the third lens holding frame 8 as viewed in the direction orthogonal to the optical axis direction of the plurality of lens units. Therefore, the interchangeable lens 100 according to the present exemplary embodiment can be reduced in size in the optical axis direction compared to a configuration in which the stepping motor 80 is provided at a different position from the cam barrel 7 or the third lens holding frame 8 in the optical axis direction.

Further, the stepping motor 80 is disposed so as to be spaced apart from the distal end portion 34a of the rotational ring 34 across a slight clearance in the optical axis direction. On the other hand, regarding the radial direction, the outer periphery surface 7a of the cam barrel 7 and the stepping motor 80 are disposed so as to be spaced apart from each other across a slight clearance in the radial direction.

The diaphragm blade containing unit 70 is disposed in a space portion sandwiched between a rearmost end portion 9b of the second lens holding frame (the first holding member) 9 and a foremost end portion 6a of the guide barrel 6. In other words, at least a part of the second lens holding frame at least a part of the diaphragm blade containing unit 70, and at least a part of the guide barrel 6 overlap one another as viewed in the optical axis direction. The at least a part of the diaphragm blade containing unit 70 referred to here is, more specifically, the blade driving ring 43 and the motor plate 42.

The rotation detection unit 60 is disposed in a space between an outer peripheral surface of a lens holding barrel portion 9a of the second lens holding frame 9 and the inner peripheral surface 5a of the focusing unit main body 5 in the radial direction. More specifically, an outermost diameter D47 of the pulse plate 47 and the outer peripheral portion of the lens holding barrel portion 9a of the second lens holding frame 9 are disposed so as to be spaced apart from each other across a slight clearance.

In other words, at least a part of the rotation detection unit 60 and at least a part of the second lens holding frame 9 overlap each other as viewed in the direction orthogonal to the optical axis. More specifically at least a part of the rotation detection unit 60 is provided in a space surrounded by one of surfaces of the flange portion 9c in the direction orthogonal to the optical axis that is located closest to the rotation detection unit 60 and one of surfaces of the lens holding barrel portion 9a in the optical axis direction that is located closest to the rotation detection unit 60. The lens holding barrel portion 9a referred to here means a portion of the second lens holding frame 9 that does not include the flange portion 9c, which will be described below. Therefore, the interchangeable lens 100 according to the present exemplary embodiment can be further reduced in size in the optical axis direction.

Further, the rotation detection unit 60 is disposed so as to be spaced apart from the flange portion 9c of the second lens holding frame 9 across a slight clearance in the optical axis direction. The stepping motor 80 is disposed so as to be spaced apart from the distal end portion 34a of the rotational ring 34 across the slight clearance in the optical axis direction as described above.

Figure 5:
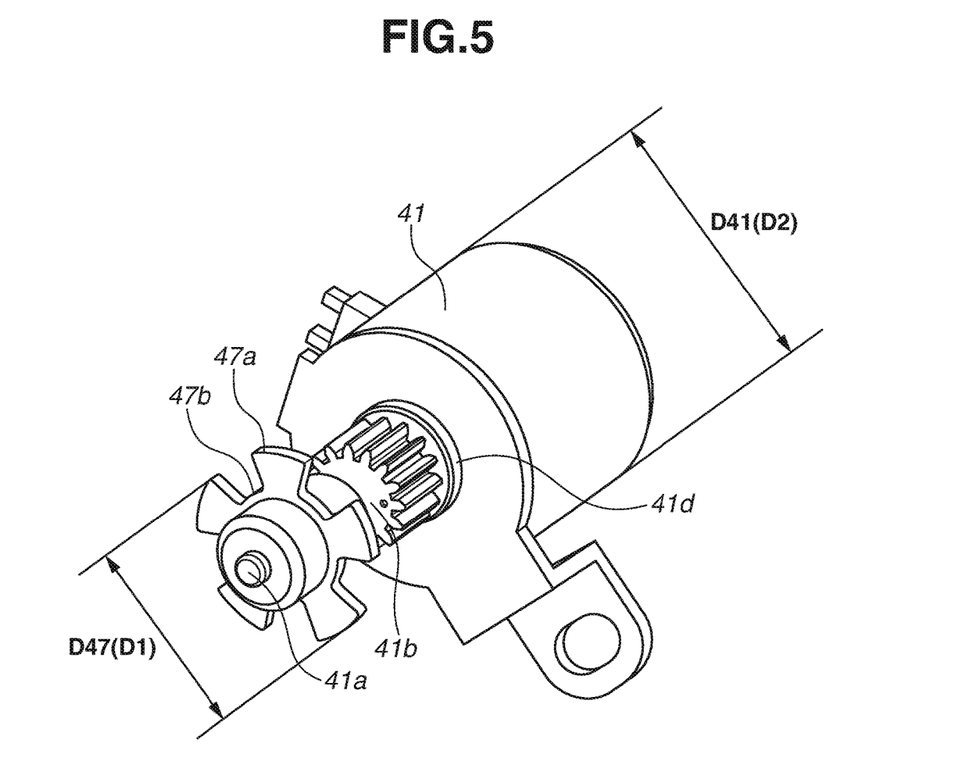
FIG. 5 is a perspective view illustrating components including a driving actuator and a rotational shaft according to an exemplary embodiment of the subject disclosure.

Now, as illustrated in FIG. 1, a relationship between a glass outermost diameter DL2 of the second lens group L2 and a glass outermost diameter DL3 of the third lens group L3 is DL2>DL3. Then, a relationship between an outer diameter D9 of the lens holding barrel portion 9a of the second lens holding frame 9 and an outer diameter D8 of a lens holding barrel portion 8a of the third lens holding frame 8 is D9>D8. Further, a diameter D7 of the outer periphery surface 7a of the cam barrel 7 driving the third lens holding frame 8 at a position where the outer periphery surface 7a overlaps the stepping motor 80 an the optical axis also has a relationship D9>D7 with the outer diameter D9 of the lens holding barrel portion 9a of the second lens holding frame 9. Then, a relationship between an outer diameter D41 of the stepping motor 80 and an outermost diameter D47 of the pulse plate 47 is D41>D47 as illustrated in FIG. 5.

With such dimensional relationships established, the rotation detection unit 60 and the stepping motor 80 are disposed on one side and the other side of the diaphragm blade containing unit 70 where the second lens holding frame 9 and the third lens holding frame 8 are located, respectively.

As a result, the stepping motor 80 and the rotation detection unit 60 are efficiently contained in a space formed by the second lens holding frame 9, the inner periphery surface 5a of the focusing unit main body 5, the distal end portion 34a of the rotational ring 34, and the outer periphery surface 7a of the cam barrel 7. Arranging the layout in this manner allows the aperture apparatus 40 to be disposed without preparing a space more than a necessary amount in the optical axis direction between the second lens group L2 and the third lens group L3.

In other words, a distance from the second lens group L2 (including the holding structure) to the third lens L3 (a distance including the aperture apparatus 40) can be reduced as much as possible (including even the structure of the focusing actuator 30 for driving the third lens L3). Therefore, the present exemplary embodiment allows the interchangeable lens 100 to prevent or cut down an increase in a size of the imaging optical system even when the aperture apparatus 40 including the rotation detection unit 60 is disposed in the holding element of the imaging optical system.

Figure 8A:
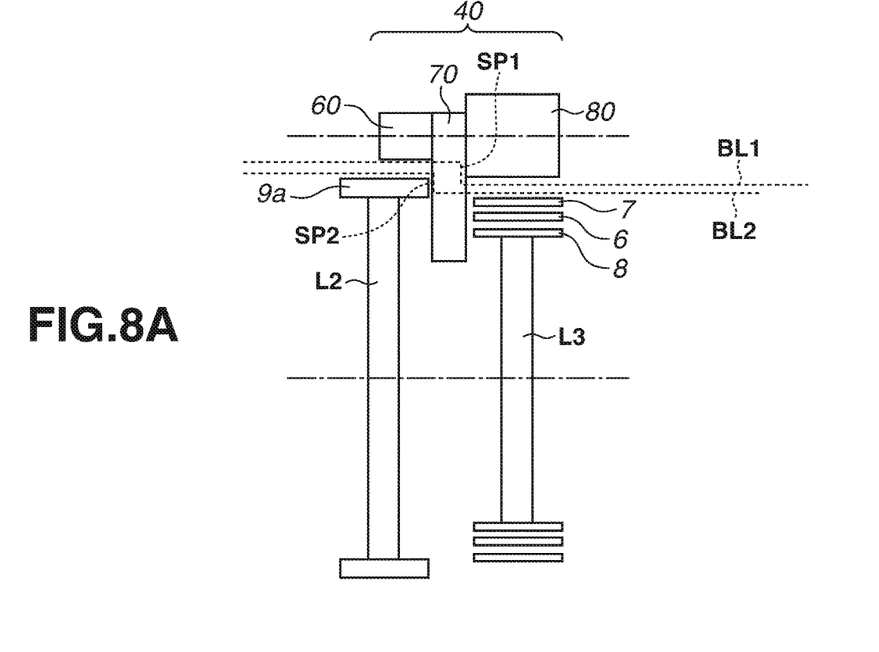
FIGS. 8A and 8B illustrate dimensional relationships between individual components according to the first exemplary embodiment and an exemplary modification of the first exemplary embodiment, respectively.

Now, as illustrated in FIG. 8A, assume that SP1 represents a stepped portion indicated by a broken line BL1 drawn along the rotation detection unit 60 and the stepping motor 80, and SP2 represents a stepped portion indicated by a broken line BL2 drawn along the lens holding barrel portion 9a and the cam barrel 7. In this case, the configuration of the interchangeable lens 100 according to the present exemplary embodiment can also be restated as a configuration in which the stepped portion SP1 and the stepped portion SP2 face each other. The above-described configuration can be further restated as a configuration in which at least a part of the second lens holding frame 9 and at least a part of the stepping motor 80 overlap each other as viewed in the optical axis direction.

In other words, assume that $D_{HM1}$ represents a diameter of the second lens holding frame 9, $D_{HM2}$ represents a diameter of the third lens holding frame 8, $D_1$ represents a diameter of the rotation detection unit 60, and $D_2$ represents a diameter of the stepping motor 80. In this case, the interchangeable lens 100 satisfies $D_{HM1}>D_{HM2}$ and $D_1<D_2$. Further, assuming that $D_{LU1}$ represents a diameter of the second lens group L2 and $D_{LU2}$ represents a diameter of the third lens group L3, the interchangeable lens 100 satisfies $D_{LU1}>D_{LU2}$.

In the present exemplary embodiment, $D_{HM1}$ referred to here corresponds to the above-described outer diameter D9 of the lens holding barrel portion 9a of the second lens holding frame 9, and $D_{HM2}$ corresponds to the outer diameter D8 of the lens holding barrel portion 8a of the third lens holding frame 8. Further, in the present exemplary embodiment, $D_1$ corresponds to the above-described outermost diameter D47 of the pulse plate 47, and $D_2$ corresponds to the outer diameter D41 of the stepping motor 80. Then, in the present exemplary embodiment, $D_{LU1}$ corresponds to the glass outermost diameter DL2 of the second lens group L2, and $D_{LU2}$ corresponds to the glass outermost diameter DL3 of the third lens group L3. An outermost diameter of some lens group is defined in such a manner that, in a case where this lens group is a set of a plurality of lenses, the outermost diameter of the lens group refers to a diameter of a lens having a largest diameter, and, in a case where this lens group includes only a single lens as a lens, the outermost diameter of the lens group refers to a diameter of this single lens.

In this manner, the interchangeable lens 100 includes the second lens holding frame 9 holding the second lens group L2 disposed on the one side of the diaphragm blade containing unit 70 where the rotation detection unit 60 is located and closest to the aperture apparatus 40 among the plurality of lens units (lens groups) included therein. Further, the interchangeable lens 100 includes the third lens holding frame 8 holding the third lens group L3 disposed on the other side of the diaphragm blade containing unit 70 where the stepping motor 80 is located and closest to the aperture apparatus 40. Then, the interchangeable lens 100 is configured in such a manner that the above-described dimensional relationship is established between the rotation detection unit 60 and the stepping motor 80 when the second lens holding frame 9 and the third lens holding frame 8 are in the above-described dimensional relationship. Due to this configuration, the interchangeable lens 100 according to the present exemplary embodiment can prevent or cut down the increases in the sizes in the radial direction and the optical axis direction by efficiently utilizing the space.

The interchangeable lens 100 as the optical apparatus according to the present exemplary embodiment can also be expressed in the following manner. That is, the interchangeable lens 100 includes the third lens holding frame 8 holding the third lens group L3, and the second lens holding frame 9 provided on the object side with respect to this third lens holding frame 8 and holding the second lens group L2 larger in diameter than the third lens group L3. The interchangeable lens 100 further includes the aperture apparatus 40. Then, the aperture apparatus 40 includes the diaphragm blade containing unit 70, and the rotation detection unit 60 provided on the one side where the second lens holding frame 9 is located with respect to the diaphragm blade containing unit 70. The aperture apparatus 40 further includes the stepping motor 80 provided on the other side where the third lens holding frame 8 is located with respect to the diaphragm blade containing unit 70, and larger in diameter than the rotation detection unit 60 (the pulse plate 47).

(Exemplary Modification of Present Exemplary Embodiment)

Figure 8B:
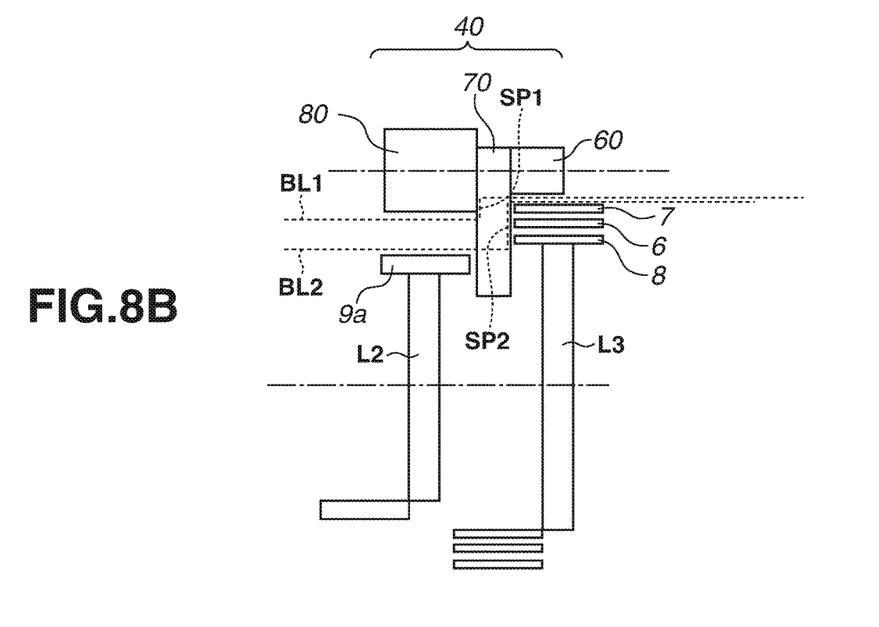

The dimensional relationship is set to DL2>DL3 ($D_{LU1}>D_{LU2}$) in the present exemplary embodiment, but may be DL2<DL3 ($D_{LU1}<D_{LU2}$) as illustrated in FIG. 8B. In this case, the relationship between the diameter D7 of the outer periphery surface 7a of the cam barrel 7 and the outer diameter D9 of the lens holding barrel portion 9a of the second lens holding frame 9 is changed to D9<D7 ($D_{HM1}<D_{HM2}$). In this case, the layout is modified in such a manner that the motor plate 42, the blade driving ring 43, the diaphragm blades 44, and the cam plate 45 forming the diaphragm blade containing unit 70 are arranged in an opposite order from the present exemplary embodiment in the optical axis direction.

Then, the stepping motor 80 and the rotation detection unit 60 are disposed on the one side and the other side of the diaphragm blade containing unit 70 where the second lens holding frame 9 and the third lens holding frame 8 are located, respectively. As a result, the distance from the second lens L2 (including the holding structure) to the third lens L3 (the distance including the aperture apparatus 40) can be reduced as much as possible (even including the structure of the focusing actuator 30 for driving the third lens L3). Therefore, the present exemplary embodiment allows the interchangeable lens 100 to prevent or cut down the increase in the size of the imaging optical system even when the aperture apparatus 40 including the rotation detection unit 60 is disposed in the holding element of the imaging optical system.

Figure 6:
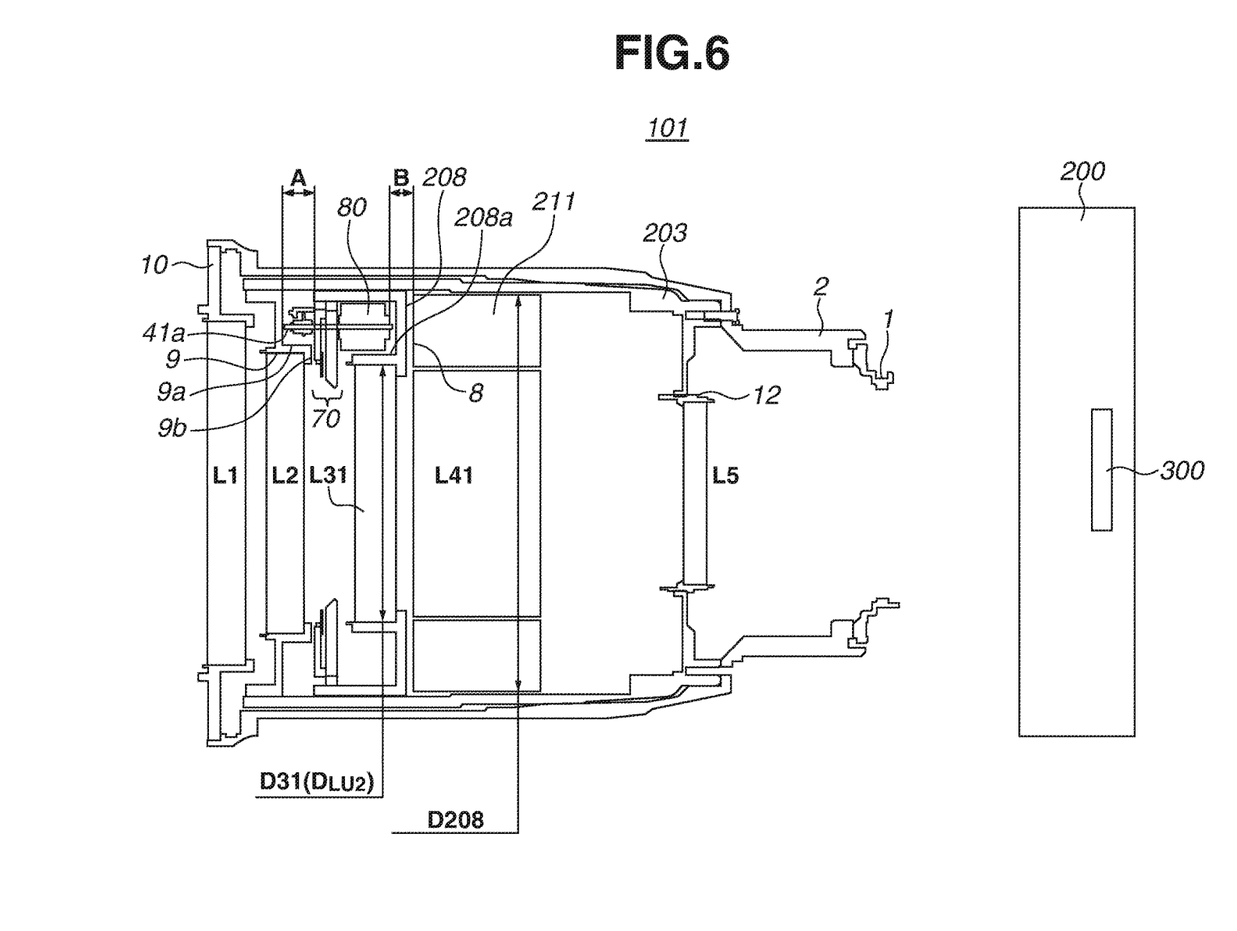
FIG. 6 is a cross-sectional view illustrating a configuration holding a partial optical system of an interchangeable lens according to an exemplary embodiment of the subject disclosure.

Next, a configuration of an interchangeable lens 101 as a second exemplary embodiment of the present disclosure will be described with reference to FIG. 6. FIG. 6 is a cross-sectional view extracting a part of an imaging optical system according to the present exemplary embodiment. Components having similar functions to the above-described first exemplary embodiment will be identified by similar reference numerals to the first exemplary embodiment, and descriptions thereof will be omitted. A difference between the above-described first exemplary embodiment and the present exemplary embodiment is that the aperture apparatus 40 is held by a third lens holding frame 208.

The third lens holding frame 208 holds a third lens group L31, and the second lens holding frame 9, the third lens holding frame 208, a fourth lens group unit 211, and the fifth lens holding frame 12 holding the fifth lens group L5 are fixed to a fixed barrel 203. The aperture apparatus 40 is held by the third lens holding frame 208.

The fourth lens group unit 211 is a unit including a not-illustrated fourth lens holding frame holding a fourth lens group L41 therein and configuring the fourth lens group L41 movably in the optical axis direction or in a plane orthogonal to the optical axis according to an imaging state. For example, the fourth lens group unit 211 is a focusing group diving unit in a case where the fourth lens group L41 is a focusing group, or an image stabilization group unit in a case where the fourth lens group L41 is an image stabilization group for reducing a camera shake. The fourth lens group unit 211 includes a mechanical structure that is moved together with the fourth lens group L41 by an equal amount thereto within its region.

(Configuration Capable of Radial Size Reduction)

In the present exemplary embodiment, the aperture apparatus 40 is also configured in such a manner that at least a part of the diaphragm blade containing unit 70, at least a part of the stepping motor 80, and at least a part of the rotation detection unit 60 overlap one another as viewed in the direction along the central axis of the aperture. Therefore, the aperture apparatus 40 can be reduced in size in the radial direction, similarly to the above-described first exemplary embodiment.

Further, as illustrated in FIG. 6, assume that A represents a length from the surface of the diaphragm blade containing unit 70 on the object side to a portion of the rotation detection unit 60 that protrudes most toward the object side. Then, assume that B represents a length from a portion of the stepping motor 80 that is located closest to the mount 1 to a portion 211a of the fourth lens group unit 211 that faces the stepping motor 80 on a front surface thereof in the optical axis direction. In this case, the interchangeable lens 101 satisfies a relationship A>B. The interchangeable lens 101 satisfying the relationship A>B means that the stepping motor 80 and the fourth lens group unit 211 approach each other in the optical axis direction.

With the interchangeable lens 101 satisfying the relationship A>B, the stepping motor 80 and the fourth lens group unit 211 approach each other in the optical axis direction as described above. Therefore, it is difficult to provide the rotation detection unit 60 on one side where the fourth lens group unit 211 is located with respect to the stepping motor 80 in this state. If ever the rotation detection unit 60 is attempted to be provided on the one side where the fourth lens group unit 211 is located with respect to the stepping motor 80, this attempt would undesirably lead to an increase in a size of the interchangeable lens 101 in the optical axis direction.

Therefore, in the present exemplary embodiment, a space S is efficiently utilized by adding the dimensional lines defining the width A and providing the rotation detection unit 60 in the space S between the second lens holding frame 9 and the fixed barrel 203. As a result, the present exemplary embodiment allows the rotation detection unit 60 to be provided while preventing or cutting down the above-described increase in the size of the interchangeable lens 101 in the optical axis direction.

Further, a relationship between the glass outermost diameter DL2 of the second lens group L2 and a glass outermost diameter DL31 of the third lens group L31 is DL2>DL31. A relationship between the outer diameter D9 of the lens holding barrel portion 9a of the second lens holding frame 9 and an outer diameter D208 of a lens holding barrel portion 208a of the third lens holding frame 208 is D9>D208. Then, the relationship between the outer diameter D41 of the stepping motor 80 and the outermost diameter D47 of the pulse plate 47 is D41>D47, similarly to the above-described first exemplary embodiment.

With such dimensional relationships established, the rotation detection unit 60 and the stepping motor 80 are disposed an one side and the other side of the diaphragm blade containing unit 70 where the second lens holding frame 9 and the third lens holding frame 208 are located, respective similarly to the above-described first exemplary embodiment. As a result, the interchangeable lens 101 allows the aperture apparatus 40 to be disposed without preparing a space more than a necessary amount in the optical axis direction between the second lens group L2 and the third lens group L3, similarly to the above-described first exemplary embodiment.

More specifically, the rotation detection unit 60 and the stepping motor 80 are disposed on one side and the other side of the diaphragm blade containing unit 70 where the object and the mount 1 are located, respectively. As a result, a distance from the second lens group L2 to the fourth lens group L41 (a distance including the aperture apparatus 40 and the third lens group L31) can be reduced (=made compact) (including even the structure). Therefore, the present exemplary embodiment allows the interchangeable lens 101 to prevent or cut down the increase in the size of the imaging optical system even when the aperture apparatus 40 including the rotation detection unit 60 is disposed in the holding element of the imaging optical system.

(Exemplary Modification of Present Exemplary Embodiment)

In the present exemplary embodiment, the dimensional relationship may also be changed to DL2<DL31, and the layout may also be modified in such a manner that the motor plate 42, the blade driving ring 43, the diaphragm blades 44, and the cam plate 45 forming the diaphragm blade containing unit 70 are arranged in the opposite order in the optical axis direction, similarly to the exemplary modification of the above-described first exemplary embodiment. Then, the stepping motor 80 and the rotation detection unit 60 may be disposed on the one side and the other side of the diaphragm blade containing unit 70 where the second lens holding frame 9 and the third lens holding frame 208 are located, respectively.

Due to this configuration, in the present exemplary embodiment, the interchangeable lens 100 is also allowed to prevent or cut down the increase in the size of the imaging optical system even when the aperture apparatus 40 including the rotation detection unit 60 is disposed in the holding element of the imaging optical system, similarly to the above-described first exemplary embodiment.

Next, a configuration of an interchangeable lens 102 having a function as a zoom lens will be described as a third exemplary embodiment of the present disclosure with reference to FIGS. 7A and 7B. Components having similar functions to the above-described first or second exemplary embodiment will be identified by similar reference numerals to the first or second exemplary embodiment, and descriptions thereof will be omitted.

Figure 7A:
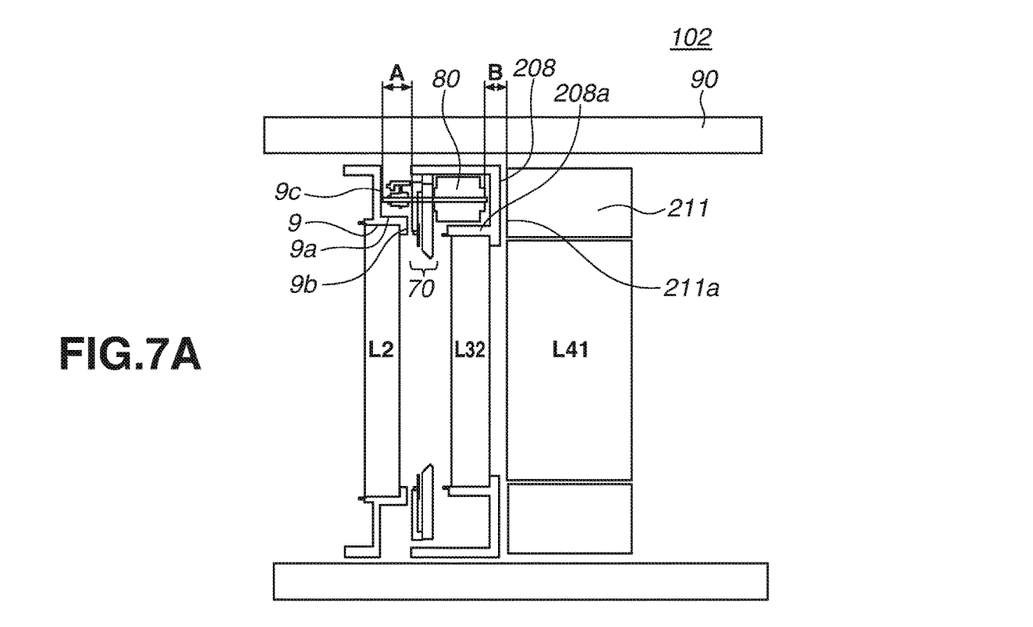
FIGS. 7A and 7B are cross-sectional views illustrating a configuration holding a partial optical system of an interchangeable lens according to an exemplary embodiment of the subject disclosure.
Figure 7B:
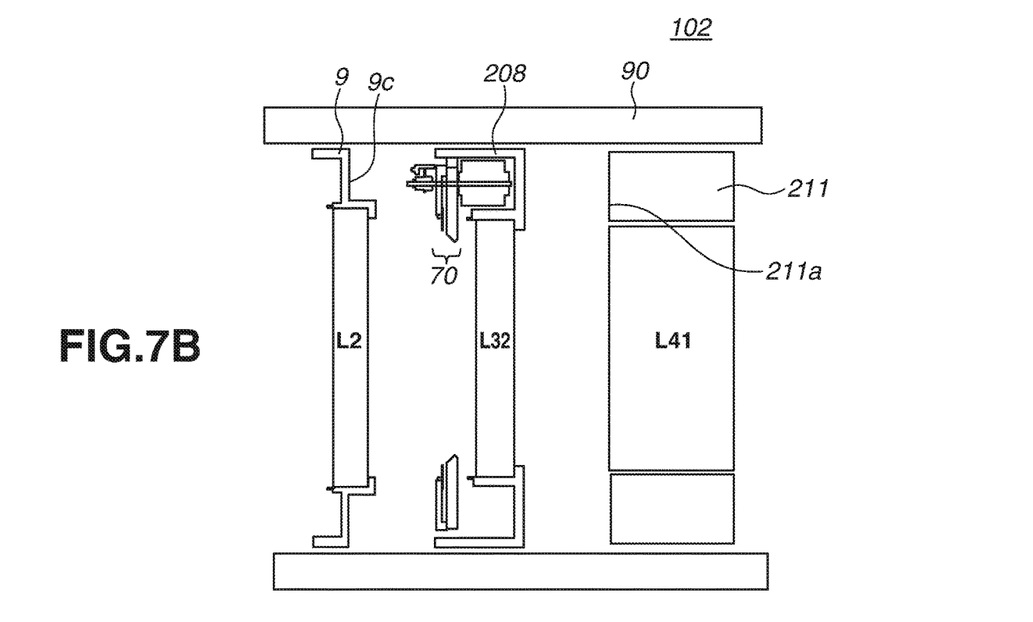

Both FIGS. 7A and 7B illustrate predetermined zooming states of an imaging optical system driven by zooming. At least one of the second lens group L2, a third lens group L32, and the fourth lens group L41 is a lens that is moved in the optical axis direction for the zooming. The aperture apparatus 40 is held by the third lens holding frame 208. A lens group driving mechanism 90 includes a mechanism for driving a frame holding the lens that is moved by the zooming. In FIGS. 7A and 7B, only the third lens group L32 is fixed even during the zooming, and only the second lens group L2 and the fourth lens group L41 are moved in the optical axis direction during the zooming.

FIG. 7A illustrates a state in which a distance B is maximally narrowed during the zooming (in a range where the second lens holding frame 9 is movable), and the interchangeable lens 102 also satisfies the relationship A>B similarly to the above-described second exemplary embodiment. Further, in the state illustrated in FIG. 7A, at least a part of the rotation detection unit 60 and at least a part (the lens holding barrel portion 9a) of the second lens holding frame 9 overlap each other as viewed in the direction orthogonal to the direction along the central axis of the aperture.

Further, the rotation detection unit 60 and the stepping motor 80 are disposed on one side and the other side of the diaphragm blade containing unit 70 where the object and the mount 1 are located, respectively. As a result, a distance from the second lens L2 to the fourth lens L41 (a distance including the aperture apparatus 40 and the third lens L32) can be reduced (=made compact) (including even the structure).

(Configuration Capable of Radial Size Reduction)

In the present exemplary embodiment, the aperture apparatus 40 is also configured in such a manner that at least a part of the diaphragm blade containing unit 70, at least a part of the stepping motor 80, and at least a part of the rotation detection unit 60 overlap one another as viewed in the direction along the central axis of the aperture. Therefore, the aperture apparatus 40 can be reduced in size in the radial direction, similarly to the above-described first exemplary embodiment.

(Exemplary Modification of Present Exemplary Embodiment)

The configuration in which the aperture apparatus 40 is held by the third lens holding frame 208 has been described in the present exemplary embodiment, but the aperture apparatus 40 may be, for example, configured to be held by the second lens holding frame 9.

Each of the above-described exemplary embodiments is merely a representative example, and can be modified or changed in various manners when the present disclosure is implemented.

In each of the above-described exemplary embodiments, the aperture apparatus 40 has been described citing the configuration in which the rotation detection unit 60 detects the rotation of the pulse plate 47 rotated integrally with the motor rotational shaft 41a with use of the photo-interrupters 48-1 and 48-2 as an example. Further, in the above-described first exemplary embodiment, the aperture apparatus 40 has been described referring to the example in which the pulse plate 47 and the pinion gear 41b are formed from different components from each other, but the pulse plate 47 and the pinion gear 41b do not necessarily have to be formed from different components from each other and may be configured to be formed integrally with each other. In this case, only the sensor holding block 46, the photo-interrupters 48-1 and 48-2, and a part of the pulse plate 47 where the protruding and recessed pattern is provided would be included in the components of the rotation detection unit 60.

Further, the rotation detection unit 60 does not necessarily have to include the photo-interrupter and the pulse plate as the detection system. For example, the rotation detection unit 60 may be configured in such a manner that a cylindrically polarized cylindrical magnet is rotated integrally with the motor rotational shaft 41a instead of the pulse plate rotated integrally with the motor rotational shaft 41a. In this case, the rotation detection unit 60 serves as a sensor capable of detecting a change in a magnetic field as the detection sensor disposed in the sensor holding block 46. For example, a Hall integrated circuit (IC) can be used. In other words, the present disclosure can be applied to a light amount adjustment apparatus including a detection unit including a detection target member integrated with a driving shaft of a driving unit and a detection sensor capable of detecting a rotation of this detection target member.

Further, in the above-described second and third exemplary embodiments, the aperture apparatus 40 has been described referring to the example in which the aperture apparatus 40 is held by the third lens holding frame 208, but may be held by a component other than the third lens holding frame 208.

Further, in the above-described third exemplary embodiment, the interchangeable lens 102 has been described citing the example in which the interchangeable lens 102 includes the optical system configured in such a manner that each of the lens holding frames disposed on the one side and the other side where the object and the mount 1 are located, respectively, is moved on the opposite sides of the lens holding frame holding the aperture apparatus 40 from each other at the time of the zooming. However, the interchangeable lens 102 may be configured in such a manner that, for example, at least one of the lens holding frame disposed on the object side and the lens holding frame disposed on the mount side is moved from the state illustrated in FIG. 7A at the time of the zooming. The movement of the lens holding frame in the optical axis direction is not limited to only the movement at the time of the zooming, and may be intended to be, for example, a movement at the time of the focusing.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-072930, filed Mar. 31, 2017, which is hereby incorporated by reference herein in its entirety.

What is claimed is:

1. A light amount adjustment apparatus comprising:
   an aperture unit including a plurality of blade members and a movable member, the plurality of blade members forming an aperture, the movable member being capable of changing a size of the aperture formed by the plurality of blade members;
   a driving unit including a driving shaft and configured to drive the movable member; and
   a detection unit including a detection target member and a detection sensor, and configured to detect a driving amount of the driving unit by detecting a driving amount of the detection target member with use of the detection sensor,
   wherein at least a part of the aperture unit, at least a part of the driving unit, and at least a part of the detection unit overlap one another, as viewed in a direction along a central axis of the aperture,
   wherein the detection target member is engaged with the driving shaft, and
   wherein an outer diameter of the detection unit is smaller than an outer diameter of the driving unit.

2. The light amount adjustment apparatus according to claim 1, wherein the aperture unit is provided between the detection unit and the driving unit in the direction along the central axis of the aperture.

3. The light amount adjustment apparatus according to claim 1, wherein the aperture unit includes a fixed member fixed in a rotational direction around the central axis of the aperture, and
   wherein the fixed member is engaged with the driving shaft.

4. The light amount adjustment apparatus according to claim 1, wherein the detection target member includes a plurality of protruding portions and a plurality of recessed portions, and
   wherein the detection sensor includes a plurality of photo-interrupters.

5. The light amount adjustment apparatus according to claim 1, further comprising: a first gear portion provided between the detection unit and the driving unit in the direction along the central axis of the aperture and engaged with the driving shaft, a second gear portion provided at a part of an outer periphery of the movable member and having a meshing relationship with the first gear portion.

6. An optical apparatus comprising:
   a light amount adjustment apparatus; and
   a plurality of lens units,
   wherein the light amount adjustment apparatus includes
   an aperture unit including a plurality of blade members and a movable member, the plurality of blade members forming an aperture, the movable member being capable of changing a size of the aperture formed by the plurality of blade members,
   a driving unit configured to drive the movable member, and
   a detection unit configured to detect a driving amount of the driving unit,
   wherein at least a part of the aperture unit, at least a part of the driving unit, and at least a part of the detection unit overlap one another, as viewed in a direction along a central axis of the aperture,
   wherein an outer diameter of the detection unit is smaller than an outer diameter of the driving unit, and
   wherein the plurality of lens units includes a first holding member provided at a position on one side the aperture unit where the detection unit is located and closest to the light amount adjustment apparatus while holding a first lens unit among the plurality of lens units, and a second holding member provided at a position on another side of the aperture unit where the driving unit located and closest to the light amount adjustment apparatus while holding a second lens unit among the plurality of lens units.

7. The optical apparatus according to claim 6, wherein, the aperture unit is provided between the detection unit and the driving unit in the direction along the central axis of the aperture.

8. The optical apparatus according to claim 6, wherein the detection target member includes a plurality of protruding portions and a plurality of recessed portions, and
wherein the detection sensor includes a plurality of photo-interrupters.

9. The optical apparatus according to claim 6, further comprising: a first gear portion provided between the detection unit and the driving unit in the direction along the central axis of the aperture and engaged with the driving shaft, a second gear portion provided at a part of an outer periphery of the movable member and having a meshing relationship with the first gear portion.

10. The optical apparatus according to claim 6, wherein, assuming that $D_{HM1}$ represents a diameter of the first holding member and $D_{HM2}$ represents a diameter of the second holding member, the optical apparatus satisfies $D_{HM1} > D_{HM2}$.

11. The optical apparatus according to claim 6, wherein, assuming that $D_{LU1}$ represents a diameter of the first lens unit and $D_{LU2}$ represents a diameter of the second lens unit, the optical apparatus satisfies $D_{LU1} > D_{LU2}$.

12. The optical apparatus according to claim 6, wherein at least a part of the first holding member and at least a part of the detection unit overlap each other, as viewed in a predetermined direction among directions orthogonal to the direction along the central axis of the aperture.

13. The optical apparatus according to claim wherein at least a part of the second holding member and at least a part of the driving unit overlap each other, as viewed in a predetermined direction among directions orthogonal to the direction along the central axis of the aperture.

14. The optical apparatus according to claim 6, wherein the light amount adjustment apparatus is held by the first holding member or the second holding member.

15. The optical apparatus according to claim 6, further comprising a cylindrical member configured to hold the first holding member,
wherein the light amount adjustment apparatus is held by the cylindrical member.

16. The optical apparatus according to claim 6, wherein the optical apparatus is an interchangeable lens attachable to and detachable from a camera main body including an image sensor.

17. The optical apparatus according to claim 6, further comprising a camera main body including an image sensor.

* * * * *